United States Patent
Rowley et al.

(10) Patent No.: US 6,941,105 B1
(45) Date of Patent: Sep. 6, 2005

(54) SYSTEM AND METHOD TO REDUCE THE TIME AND COMPLEXITY OF INFORMATION TECHNOLOGY CLASSROOM SETUP

(75) Inventors: David Dean Rowley, Spanish Fork, UT (US); Jeffrey Alan Fischer, Provo, UT (US); Thomas Keoki Christensen, Santaquin, UT (US); Keith Lars Jenkins, Lehi, UT (US); Craig Ralph Jenkins, Orem, UT (US); Sean Daniel Gale, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 117 days.

(21) Appl. No.: 10/060,345

(22) Filed: Feb. 1, 2002

Related U.S. Application Data
(60) Provisional application No. 60/330,544, filed on Oct. 24, 2001.

(51) Int. Cl.[7] .............................................. G09B 7/00
(52) U.S. Cl. ........................ 434/350; 434/362; 434/219
(58) Field of Search ................................ 434/362, 350, 434/336, 322, 118, 219, 323

(56) References Cited

U.S. PATENT DOCUMENTS

| | | | |
|---|---|---|---|
| 5,310,349 A | * | 5/1994 | Daniels et al. ......... 434/350 X |
| 5,511,217 A | * | 4/1996 | Nakajima et al. ........... 718/100 |
| 5,553,291 A | * | 9/1996 | Tanaka et al. ................. 718/1 |
| 5,572,694 A | * | 11/1996 | Uchino .......................... 718/1 |

(Continued)

OTHER PUBLICATIONS

"*Certified Directory Engineer—Practicum*" [online], Jan. 2001 [retrieved on Feb. 12, 2002], retrieved from the Internet: <URL: http://www.novell.com/inc/pf/pf.jsp>, 5 pages.
"*Beyond the Basics: The Excel 2000 Expert Exam*" [online], Jan. 2, 2001 [retrieved on Feb. 28, 2002], retrieved from the Internet: <URL: http://certcities.com/certs/mous/exams/story.asp?EditorialsID=16>, 5 pages.

(Continued)

*Primary Examiner*—Chanda L. Harris
(74) *Attorney, Agent, or Firm*—Pillsbury Winthrop LLP

(57) ABSTRACT

A system and method to reduce the time and complexity of IT classroom setup. The present invention leverages virtual machine technology to create a new learning platform. In one embodiment, the system includes a classroom computer having installed therein a virtual machine platform, virtual machines, and an exercise launcher. The system also includes a database for associating classroom exercises with one or more of the virtual machines. The launcher has a user interface that enables a student to select a classroom exercise. In response to the student selecting a classroom exercise, the exercise launcher determines the virtual machines associated with the selected exercise and requests the virtual machine platform to launch the determined virtual machines. In this way, the classroom computer is automatically configured to enable the student to perform the entire exercise.

46 Claims, 8 Drawing Sheets

U.S. PATENT DOCUMENTS

| | | | |
|---|---|---|---|
| 5,602,982 A | | 2/1997 | Judd et al. |
| 5,621,912 A | * | 4/1997 | Borruso et al. ................ 718/1 |
| 5,704,791 A | | 1/1998 | Gillio |
| 5,743,743 A | * | 4/1998 | Ho et al. ................ 434/236 X |
| 5,823,781 A | | 10/1998 | Hitchcock et al. |
| 5,827,070 A | | 10/1998 | Kershaw et al. |
| 5,953,536 A | * | 9/1999 | Nowlin, Jr. .............. 713/323 X |
| 6,033,226 A | * | 3/2000 | Bullen .................... 434/219 X |
| 6,099,320 A | * | 8/2000 | Papadopoulos ......... 434/322 X |
| 6,135,776 A | * | 10/2000 | Erturk et al. ........... 434/276 X |
| 6,149,441 A | * | 11/2000 | Pellegrino et al. ...... 434/350 X |
| 6,157,808 A | | 12/2000 | Hollingsworth |
| 6,190,178 B1 | | 2/2001 | Oh |
| 6,260,068 B1 | * | 7/2001 | Zalewski et al. ........... 709/226 |
| 6,269,409 B1 | * | 7/2001 | Solomon ................... 719/329 |
| 6,301,462 B1 | | 10/2001 | Freeman et al. |
| 6,325,631 B1 | | 12/2001 | Kouba et al. |
| 6,341,212 B1 | | 1/2002 | Shende et al. |
| 6,370,355 B1 | * | 4/2002 | Ceretta et al. .......... 434/350 X |
| 6,505,031 B1 | * | 1/2003 | Slider et al. ............ 434/350 X |
| 6,514,085 B2 | * | 2/2003 | Slattery et al. ......... 434/335 X |
| 6,594,466 B1 | * | 7/2003 | Harned et al. .......... 434/350 X |
| 2002/0082823 A1 | * | 6/2002 | Traut ............................ 703/27 |
| 2002/0099876 A1 | * | 7/2002 | Bui et al. ....................... 710/4 |
| 2002/0103882 A1 | * | 8/2002 | Johnston et al. ............ 709/218 |
| 2002/0124127 A1 | * | 9/2002 | Dawkins et al. ............ 710/200 |
| 2002/0129212 A1 | * | 9/2002 | Lee et al. .................... 711/152 |
| 2002/0192623 A1 | | 12/2002 | Sather et al. |
| 2002/0194437 A1 | * | 12/2002 | Kapoor et al. .............. 711/153 |
| 2003/0014738 A1 | * | 1/2003 | Dawkins et al. ............ 717/131 |
| 2003/0028523 A1 | * | 2/2003 | Brown et al. ................. 707/3 |
| 2003/0033512 A1 | * | 2/2003 | Austen et al. .................. 713/2 |
| 2003/0056155 A1 | * | 3/2003 | Austen et al. ................ 714/45 |
| 2003/0061260 A1 | * | 3/2003 | Rajkumar ............... 709/104 X |
| 2003/0061540 A1 | * | 3/2003 | Lee et al. ..................... 714/31 |
| 2003/0091968 A1 | | 5/2003 | Eggert et al. |

OTHER PUBLICATIONS

"*Project 2000 Core Exam*" [online], Aug. 15, 2001 [retrieved on Feb. 28, 2002], retrieved from the Internet: <URL: http://certcities.com/certs/mous/exams/story.asp?EditorialsID=37>, 4 pages.

"*MOUS Certification*" [online], Jan. 4, 2001 [retrieved on Feb. 28, 2002], retrieved from the Internet: <URL: http://www.microsoft.com/traincert/mcp/mous/mous.asp>, 2 pages.

"Technical White Paper", VMware, Inc., 3145 Porter Drive, Building F, Palo Alto, CA 94304, Feb. 1999, 9 pages.

Munro, "Virtual Machines & VMware, Part 1" [online], Dec. 21, 2001 [retrieved on Jan. 7, 2002], retrieved from the Internet: <URL: http://www.extremetech.com/print_article/0.3428.a%3D20322.00.asp>, 12 pages.

"VMware Launches Third Generation of Award–Winning Desktop Virtualization Software", [online], Nov. 5, 2001 [retrieved on Dec. 18, 2001], retrieved from the Internet: >URL: http://www.vmware.com/news/releases/ws.3html>, 3 pages.

Nieh, Jason, et al., "*Examining VMware*", *Dr. Dobb's Journal*, vol. 25, No. 8, Aug. 2000, pp. 70, 72–74, and 76.

\* cited by examiner

SYSTEM AND METHOD TO REDUCE THE TIME AND COMPLEXITY OF INFORMATION TECHNOLOGY CLASSROOM SETUP

This application claims the benefit of U.S. Provisional Patent Application No. 60/330,544, filed Oct. 24, 2001, the entire contents of which are incorporated herein by this reference.

BACKGROUND OF THE INVENTION

1. Field of the Invention

The present invention is generally related to the field information technology education, and, more specifically, to system and methods for reducing the time it takes to set up an information technology classroom.

2. Discussion of the Background

Conventional information technology (IT) classrooms include several computers (also referred to as "machines"), with each computer possibly running a different operating system. The reason a typical IT classroom is set up in this way is that several machines are required in order for a student to complete a classroom exercise. For example, a typical classroom exercise may require the student to perform one task on a machine running one operating system (e.g., UNIX) and perform another task on a machine running a different operating system (e.g., an operating system from Microsoft).

Consequently, conventional IT classrooms have become very complex and difficult to setup. With the introduction of solutions training, this problem has only increased. In many instances, it requires several hours to setup a classroom. Thus, it is becoming increasingly expensive to provide a classroom for comprehensive IT training.

SUMMARY OF THE INVENTION

The present invention provides a system and method to overcome the above and other disadvantages associated with IT classrooms. Among other advantages, the system and method reduces the time and complexity of IT classroom setup. In short, the present invention leverages virtual machine technology to create a new learning platform.

In one embodiment, the system includes a classroom computer having installed therein a virtual machine platform, one or more virtual machines, and an exercise launcher. The system also includes a database for associating classroom exercises with one or more of the virtual machines. The exercise launcher has a user interface that enables a student to select a classroom exercise that the student desires to perform. In response to the student selecting a classroom exercise, the exercise launcher accesses the database to determine the one or more virtual machines that are associated with the selected exercise and launches the determined one or more virtual machines and places each of the one or more virtual machines in a predetermined state. Once the one or more virtual machines are running in their respective predetermined states, the student can perform the selected exercise using the virtual machines. In this way, the exercise launcher automatically configures the classroom computer, thereby enabling the student to perform the selected exercise using a single "real" machine.

In one aspect, the present invention provides a method for associating classroom exercises with virtual machines; the method includes the steps of:

(1) selecting a course, wherein the course has a set of classroom exercises;

(2) storing the name of the selected course and the names of the classroom exercises in a management database such that the names of the classroom exercises are associated with the course name;

(3) selecting one of the classroom exercises;

(4) creating a virtual machine (VM), wherein the VM is associated with a set of VM files including, at the least, a virtual disk file that functions as the VM's hard disk;

(5) placing the VM in a desired state;

(6) suspending the VM after it is placed in the desired state;

(7) creating a suspended state file that stores the state of the suspended VM, wherein the suspended state file is included in the set of VM files with which the VM is associated;

(8) associating the VM with the selected classroom exercise by storing in the management database an identifier (such as the VM's name) that identifies the VM and associating the VM identifier with the classroom exercise; and (9) repeating steps (4) through (8) if one or more additional VMs are required for a student to complete the selected classroom exercise;

(10) repeating steps (3) through (9) for the other classroom exercises in the course.

In another aspect, the present invention provides a course management software module (CMSM) for configuring a class room computer. The CMSM is operable to perform the steps of:

(1) loading a virtual machine platform (VMP) onto the classroom computer, wherein a VMP is a software layer that allows multiple operating systems environments to run concurrently using the same hardware resources (a VMP is required to run VMs on the classroom computer);

(2) accessing the management database to determine the names of the courses that are available to be loaded onto the classroom computer;

(3) displaying a list of the course names;

(4) enabling a user to select a course name from the list;

(5) accessing the management database to determine the names of the classroom exercises associated with the selected course;

(6) storing the selected course name and the names of the classroom exercises associated with the selected course in a classroom database;

(7) selecting one of the classroom exercises;

(8) accessing the management database to determine the VMs associated the selected classroom exercise;

(9) for each VM associated with the selected classroom exercise, loading on the classroom computer the set of VM files with which the VM is associated, storing in the classroom database a VM identifier that can be used to locate the set of VM files, and using the database to associate the VM identifier with the name of the selected classroom exercise; and

(10) repeating steps (7) through (9) for the other classroom exercises associated with the selected course.

In another aspect, the present invention provides an exercise loader software module (ELSM) that is used by a student when the student desires to perform a classroom exercise. The ELSM is operable to perform the steps of:

(1) accessing the classroom database to determine the names of the courses available to the student;

(2) displaying a list of the course names;

(3) enabling the student to select a course name from the list;

(4) accessing the classroom database to determine the names of the classroom exercises associated with the selected course;

(5) displaying a list of the exercise names;

(6) enabling the student to select an exercise from the list;

(7) accessing the classroom database to determine the VMs associated with the selected exercise; and (8) launching the determined VMs. Advantageously, in one embodiment, when a VM is launched, the VMP accesses a suspended state file that is associated with the VM and places the VM in the state stored in the suspended state file. After the VMs associated with the selected exercise are launched, the student can perform the exercise.

Because the above methods enable a classroom computer to execute multiple VMs concurrently, the student is able to perform an exercise using only the classroom computer. Thus, the instructor does not have to set up multiple "real" machines in order for the student to perform the exercise. In this and other ways, the present invention reduces the time and complexity of IT classroom setup.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
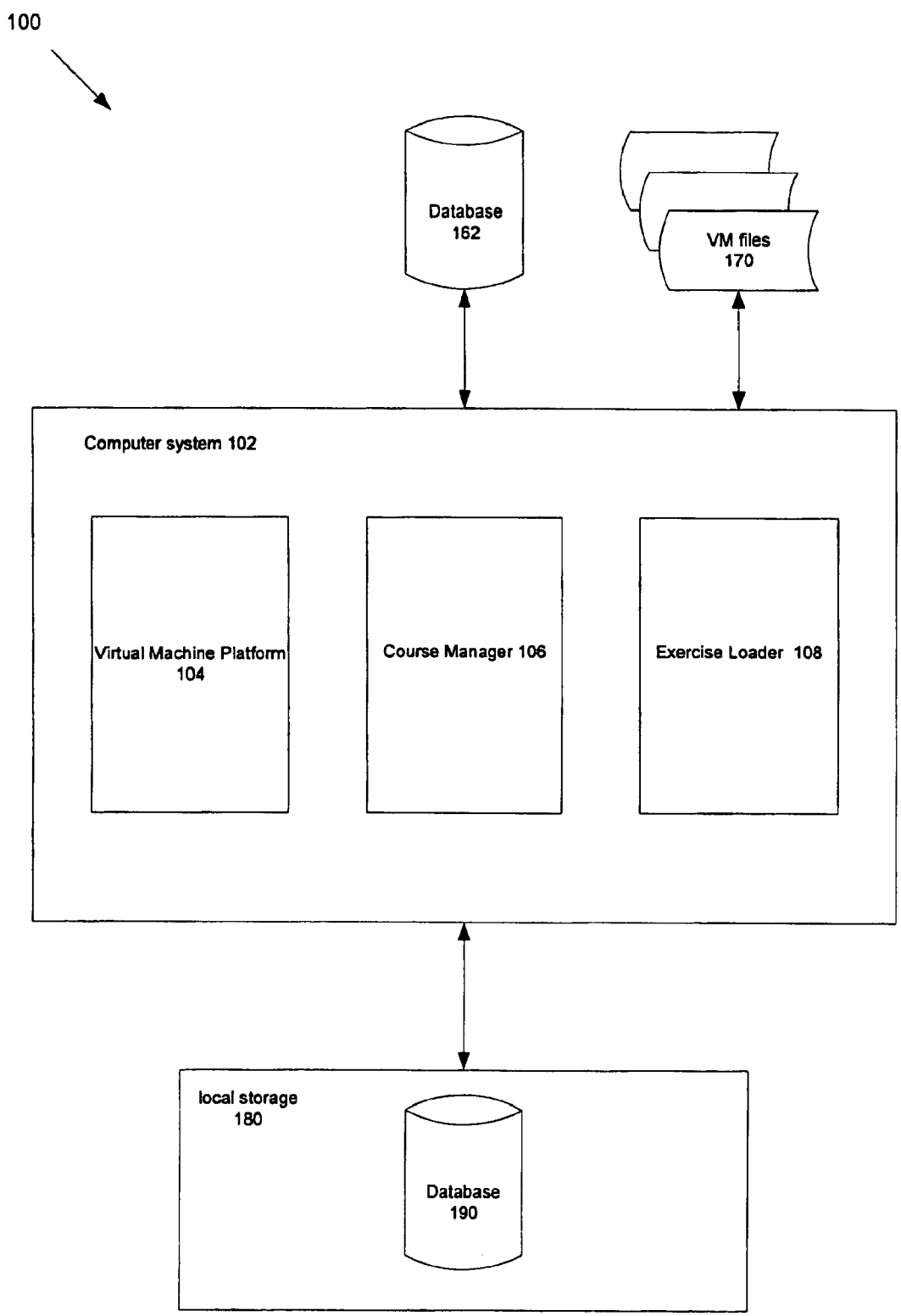
FIG. 1 is a block diagram of a system of the present invention according to one embodiment.

FIG. 1 is a block diagram of a system 100 according to one embodiment of the present invention. System 100 includes a classroom computer system 102, which includes a virtual machine platform (VMP) 104, a course management software module (CMSM) 106, and an exercise loader software module (ELSM) 108. System 100 also includes a classroom database 190, one or more sets of VM files 170, and a management database 162. Every virtual machine (VM) is associated with a set of VM files 170, which include, at the least, a virtual disk file. The set of VM files may also include a suspended state file, a redo file or other configuration file.

Management database 162 functions to associate a course with a set of classroom exercises and to associated each classroom exercise with zero or more preconfigured VMs. In one embodiment, management database 162 and the one or more sets of VM files 170 are stored on a portable storage medium, such as a compact disk (CD) or other portable storage medium. In this way, management database 162 and the sets of VM files 170 can easily be distributed to a large number of IT classrooms.

Figure 2:
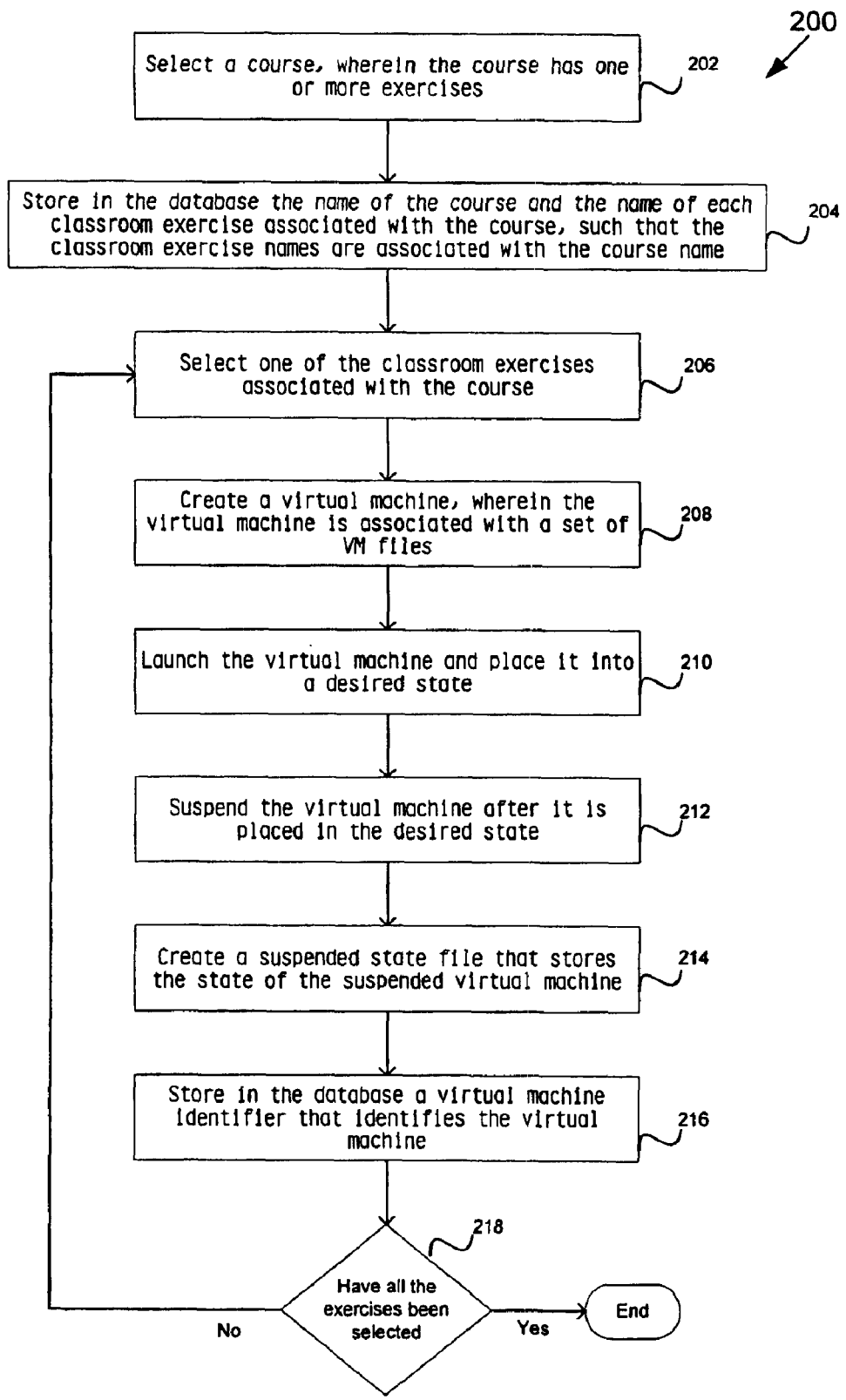
FIG. 2 is a flow chart illustrating a process for configuring a management database according to one embodiment.

FIG. 2 is a flow chart illustrating a process 200 for configuring management database 162. Process 200 begins in step 202, where a course having one or more classroom exercises is selected. Next (step 204), the name of the course and the name of each classroom exercise associated with the course are stored in database 162 such that the classroom exercise names are associated with the course name. Next (step 206), one of the classroom exercises associated with the selected course is selected. Next (step 208), a VM is created, wherein the VM is associated with a set of VM files including, at the least a virtual disk file that functions as the VMs hard disk. Next (step 210), the VM is launched and then placed into a desired state. Next (step 212), the VM is suspended after it is placed in the desired state. Next (step 214), a suspended state file that stores the state of the suspended VM is created, wherein the suspended state file is included in the set of VM files with which the VM is associated. Next (step 216), a VM identifier (e.g., a name) that identifies the VM is stored in the database and associated with the name of the classroom exercise selected in step 206. After step 216, control passes back to step 208 if one or more additional VMs are required for a student to complete the selected classroom exercises, otherwise control passes to step 218. In step 218 a determination is made as to whether all of the classroom exercises have been selected. If not, control passes back to step 206, otherwise the process ends. Process 200 is performed for each course that may be loaded on a classroom computer.

Figure 3:
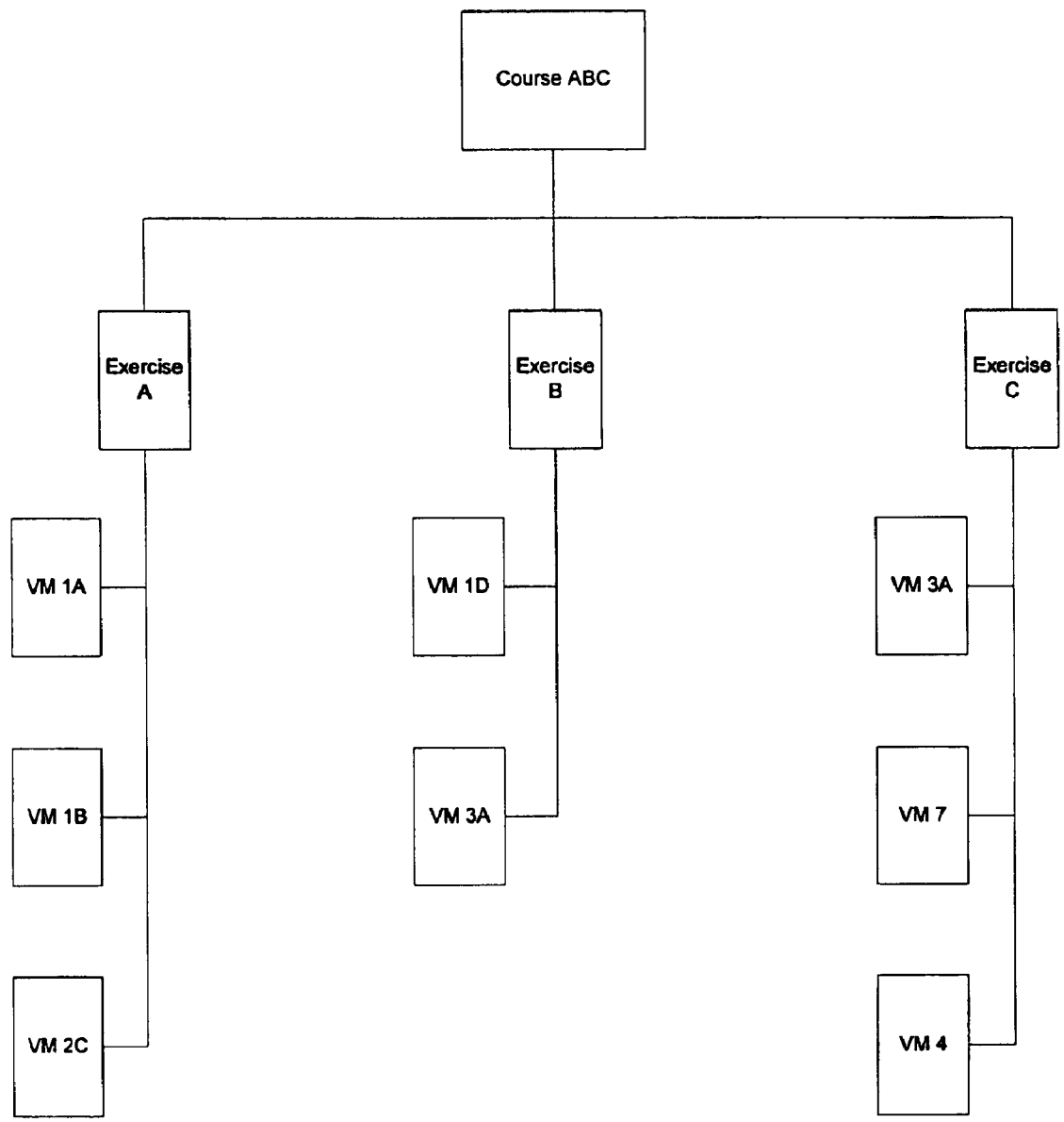
FIG. 3 is a diagram that shows the logical configuration of a configured management database according to one embodiment.

FIG. 3 is a diagram that shows the logical configuration of database 162 after process 200 is performed. As shown in FIG. 3, database 162 associates a course with a set of classroom exercises, and associates each classroom exercise with a set of VM identifiers, wherein each VM identifier identifies a VM. Each identified VM is associated with a set of VM files 170. The VM identifier that identifies a VM can be used to locate the set of VM files (e.g., the virtual disk file and suspended state file) with which the VM is associated.

Figure 4:
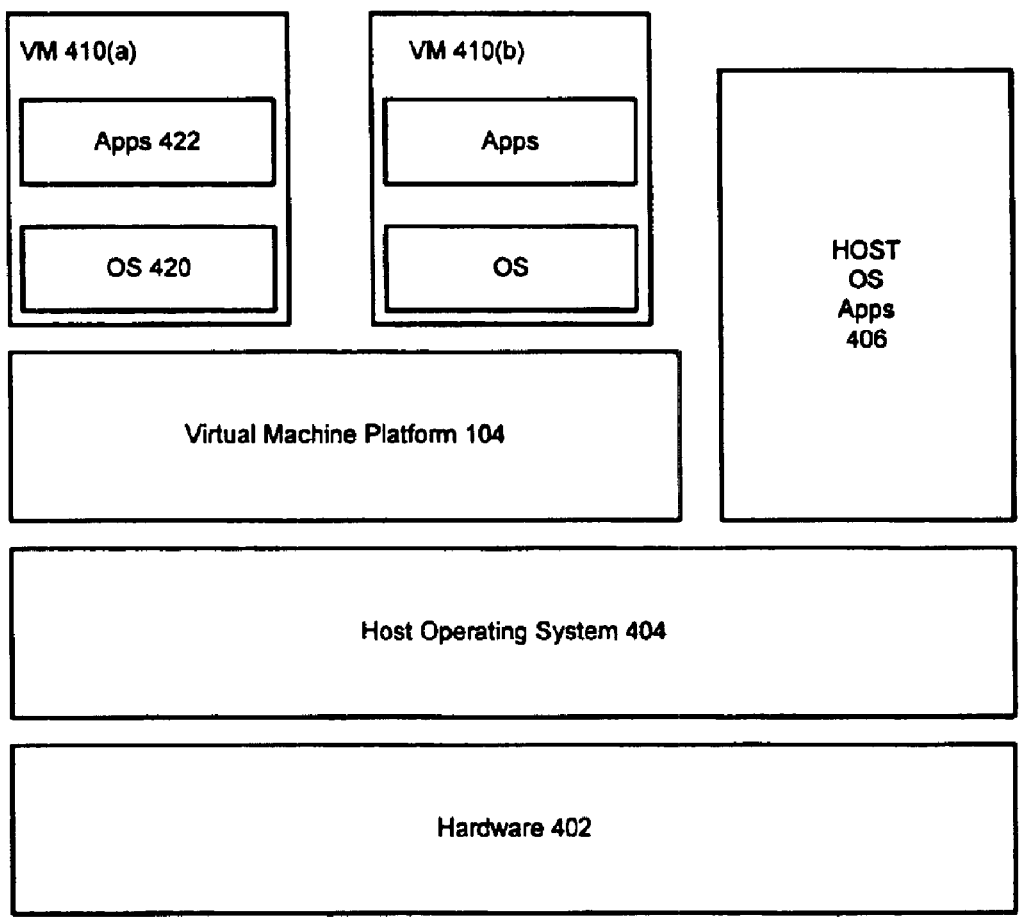
FIG. 4 is a functional block diagram illustrating a virtual machine platform and the functionality it provides.

Referring back to FIG. 1, VMP 104 is a software layer that allows multiple operating system environments to run concurrently using the same hardware resources of computer system 102. FIG. 4 is a functional block diagram further illustrating VMP 104 and the functionality it provides. As shown in FIG. 4, computer system 102 includes hardware 402 and a host operating system (H-OS) 404 running on top of the hardware 402. VMP 104 or a component of VMP 104 is an application program that runs on top of H-OS 404. Other applications, such as application 406 may also run on top of H-OS 404. VMP 104 is operable to load one or more virtual machines (VMs) 410, such as VM 410(a) and VM 410(b). A VM 410 includes an operating system 420 and application programs 422 that run on top of the operating system 420. A virtual machine platform that can be used with the present invention is VMware Workstation 3.0, which may be purchased or licensed from VMware, Inc., of Palo Alto, Calif. 94304 USA. Other hardware and software configurations may be used.

Referring back to FIG. 1, CMSM 106 is a program that is designed to be executed by a classroom instructor when the instructor desires to configure computer system 102 so that it can be used by a student who desires to perform classroom exercises. CMSM 106 is operable to display a list of available courses, enable an instructor to select one or more of the displayed courses, and load the selected courses onto classroom computer system 102. In loading a course onto computer system 102, CMSM 106 loads onto computer system 102 each VM associated with each classroom exercise included in the course. In one embodiment, CMSM 106 copies the VM file set 170 associated with each of the VMs from a first storage medium (e.g., a CD or network drive) to a local storage medium 180 accessible to computer system 102 (e.g., a hard disk connected to computer system 102). In one embodiment, for security, the VM files stored on the local storage medium are locked such that they cannot be used by applications that do not have the key to unlock them. Preferably, CMSM 106 stores the name of the loaded course into classroom database 190, which is accessible to computer system 102. Additionally, CMSM 106 stores the name of each classroom exercise in database 190, associates the names of the exercises with the course in the database, and uses database 190 to associate exercises with their associated VMs.

Figure 5:
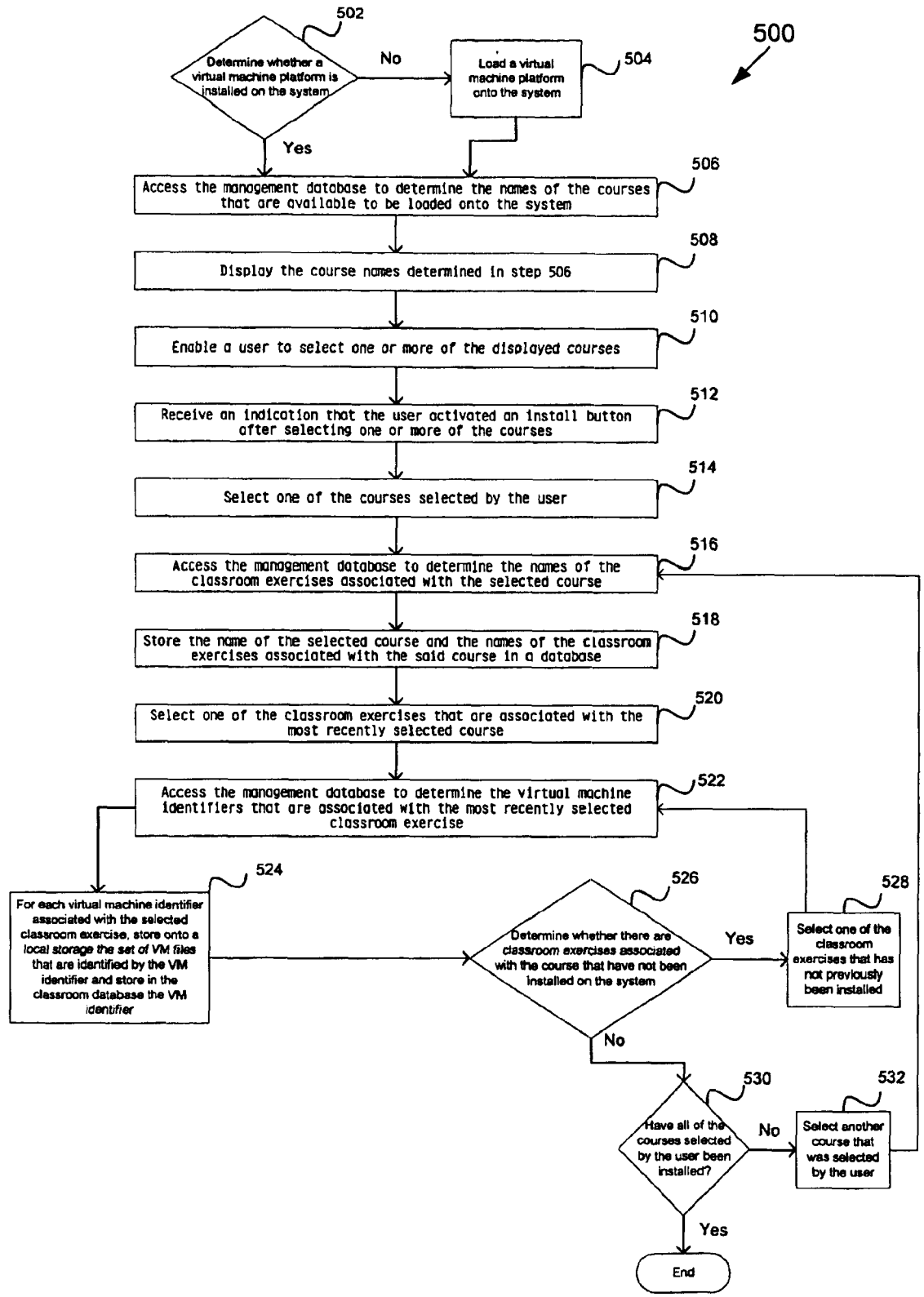
FIG. 5 is a flow chart showing an exemplary computer implemented process that is performed by a course manager according to one embodiment.

FIG. 5 is a flow chart showing an exemplary process 500 that is performed by CMSM 106 in configuring computer system 102 for use in a classroom. Process 500 begins in step 502, where CMSM 106 determines whether a VMP is installed on system 102. If a VMP is not installed on system 102, control passes to step 504, otherwise control passes to step 504. In step 504, CMSM 106 loads a VMP onto system 102.

Figure 6:
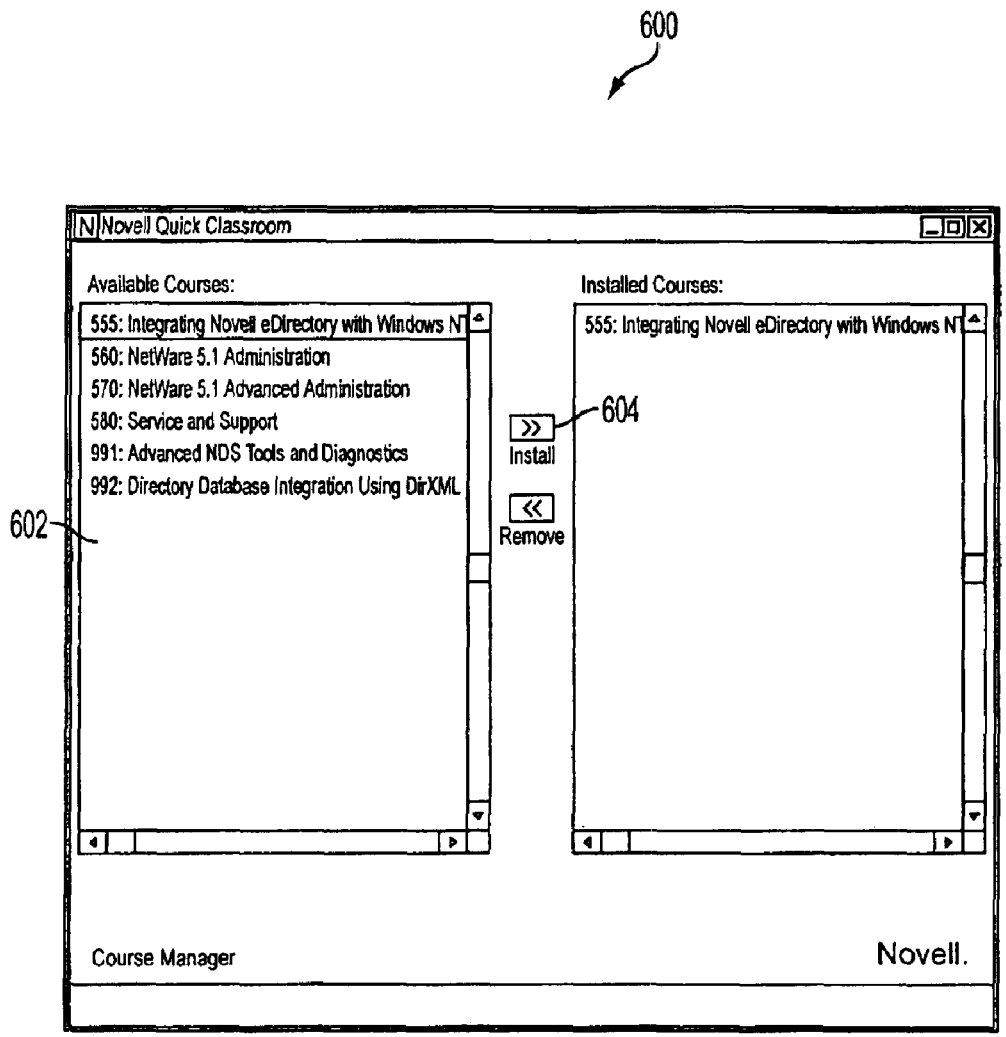
FIG. 6 illustrates an exemplary user interface for enabling a course installer to select one or more courses to be installed on a classroom computer.

In step 506, CMSM 106 accesses management database 162 to determine the names of the courses that are available to be loaded onto system 102. Next (step 508), CMSM 106 displays the course names determined in step 506. FIG. 6 is an illustration W of an exemplary user interface 600 for displaying the course names. As shown in FIG. 6, the names of the courses that are available to be loaded onto system 102 are displayed in window 602.

Next (step 510), CMSM 106 enables the user of CMSM 106 to select one or more of the displayed courses. The user can select one or more of the displayed courses and then activate (e.g., "click on") Install button 604, which when activated instructs CMSM 106 to "install" the selected courses onto system 102. In step 512, CMSM 106 receives an indication that the user activated Install button 604 after selecting one or more courses.

In response to the user selecting one or more courses and activating Install button 604, CMSM 106 selects one of the selected courses (step 514). Next (step 516), CMSM 106 accesses management database 162 to determine the names of the classroom exercises associated with the selected course. Next (step 518), CMSM 106 stores the selected course name and the names of the classroom exercises associated with the selected course in database 190. Next (step 520), CMSM 106 selects one of the classroom exercises that are associated with the course selected in step 508. Next (step 522), CMSM 106 accesses management database 162 to determine the VM identifiers that are associated with the most recently selected classroom exercise. Next (step 524), for each VM identifier associated with the selected classroom exercise, CMSM 106 stores onto local storage 180 the set of VM files that are identified by the VM identifier, stores the VM identifier in database 190, and uses database 190 to associate the VM identifier with the currently selected classroom exercise. The VM identifier can be used to locate the set of VM files on the local storage 180.

Next (step 526), CMSM 106 determines whether there are classroom exercises associated with the course selected in step 508 that have not been installed on system 102. If there are, control passes to step 528, otherwise control passes to step 530. In step 528, CMSM 106 selects one of the classroom exercises that has not previously been installed. After step 528, control passes back to step 522.

In step 530, CMSM 106 determines whether it has selected all of the courses that were selected by the user. If it has selected all of the courses selected by the user, the process ends, otherwise control passes to step 532. In step 532, CMSM 106 selects another course that was selected by the user. After step 532, control passes back to step 516.

Referring again to FIG. 1, ELSM 108 is a program that is designed to be executed by a student when the student desire to perform a classroom exercise. ELSM 108 is operable to determine the courses that have been installed on to computer system 102, display the names of those courses to the student, enable the student to select one of the displayed courses, determine the classroom exercises that are associated with the selected course, display the names of those classroom exercises, enable the student to select an exercise, determine the VMs associated with the selected exercise, unlock the VM files associated with the determined VMs, and launch the VMs associated with the selected exercise. In one embodiment, ELSM 108 determines the courses that have been loaded on to computer system 102 and determines the classroom exercises that are associated with a selected course by accessing database 190.

Figure 7:
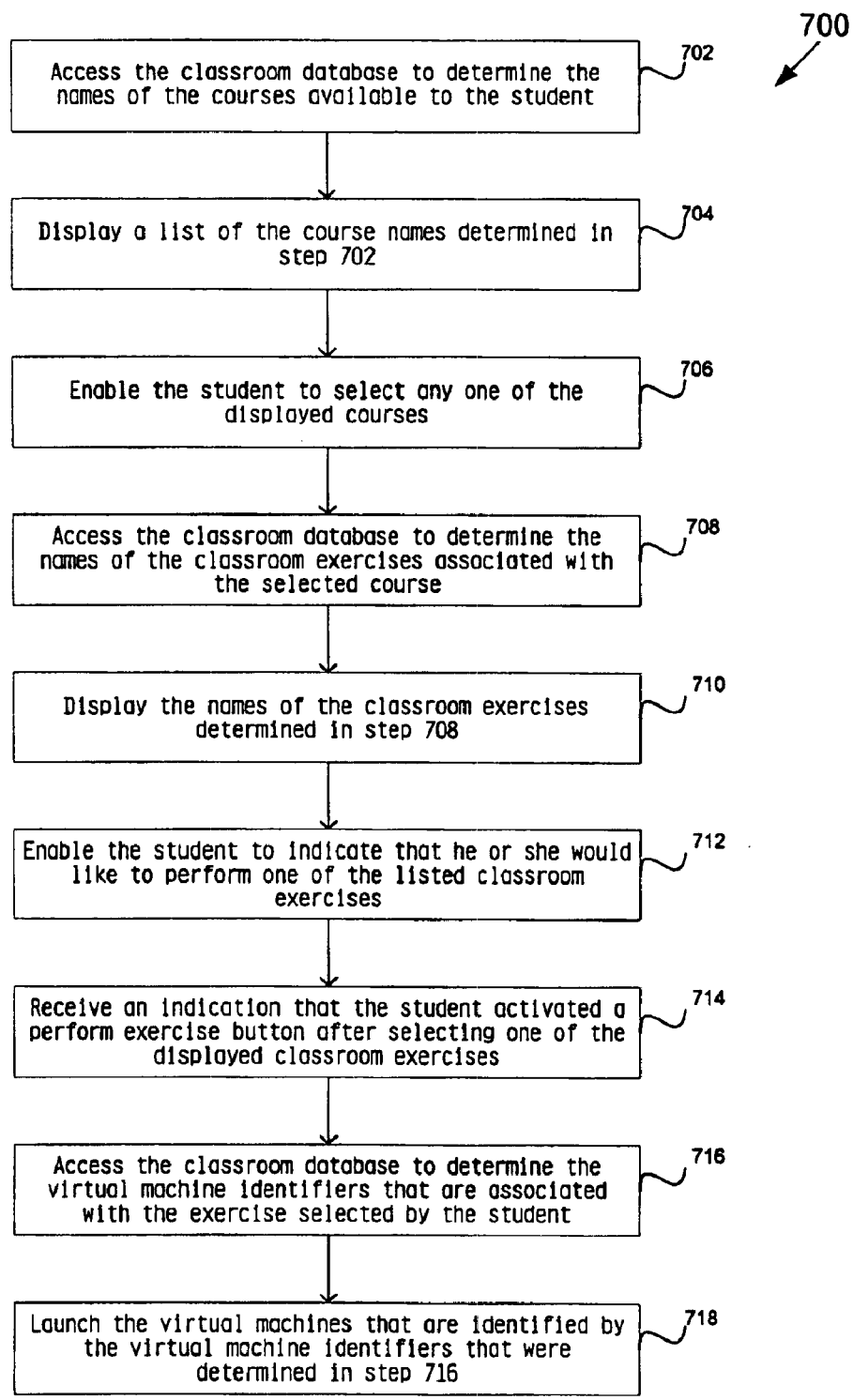
FIG. 7 is a flow chart showing an exemplary computer implemented process that is performed by an exercise launcher according to one embodiment.
Figure 8:
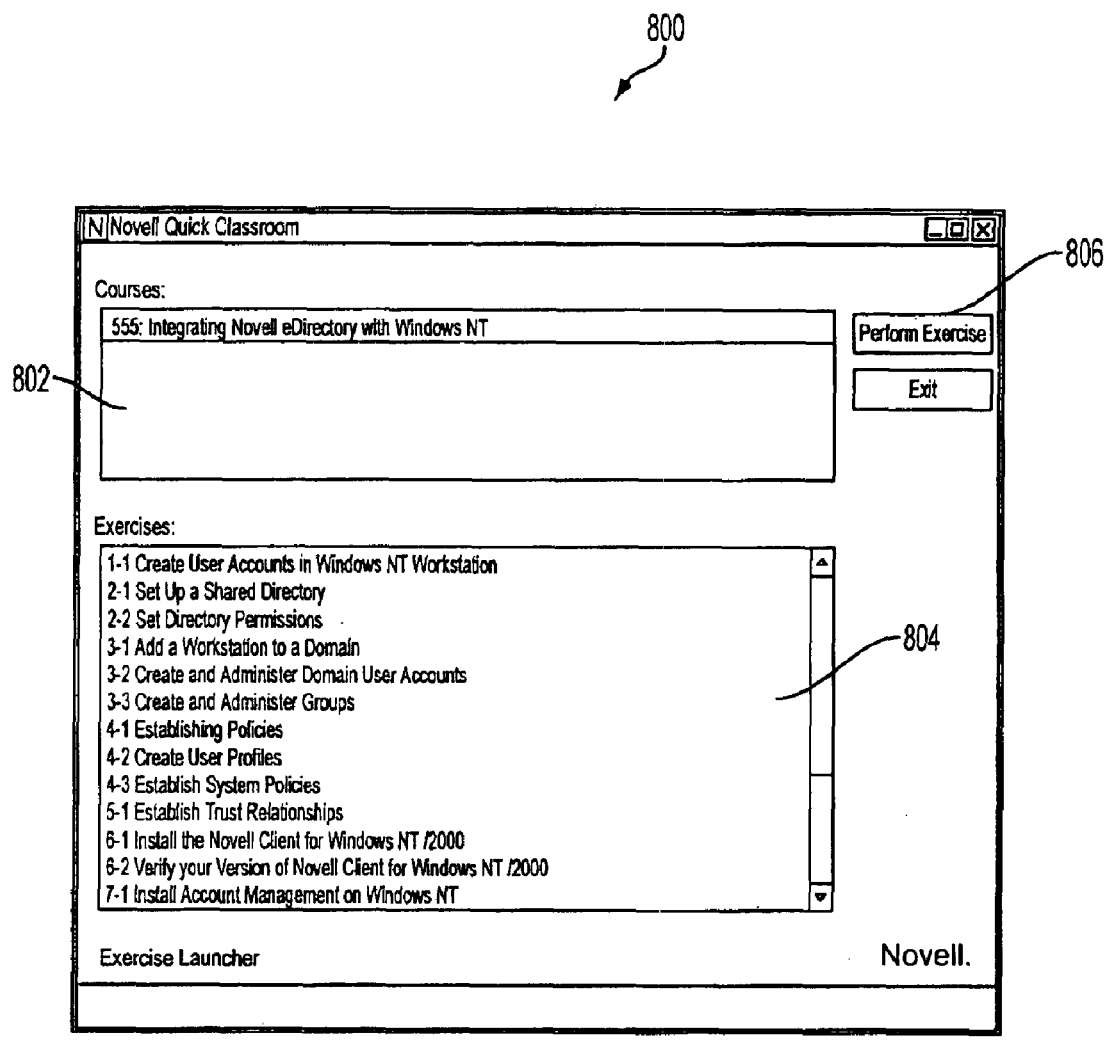
FIG. 8 illustrates an exemplary user interface for enabling a student to select and perform a classroom exercise.

FIG. 7 is a flow chart showing an exemplary process 700 that is performed by ELSM 108. Process 700 begin in step 702, where ELSM 108 accesses database 190 to determine the names of the courses available to the student. Next (step 704), ELSM 108 displays a list of the course names determined in step 702. FIG. 8 is an illustration of an exemplary user interface 800 for displaying the course names. As shown in FIG. 8, the names of the courses that are available are displayed in window 802. Next (step 706), ELSM 108 enables the student to select any one of the displayed courses. In response to the student selecting a course, ELSM 108 accesses database 190 to determine the names of the classroom exercises associated with the selected course (step 708). Next (step 710), ELSM 108 displays the classroom exercise names determined in step 708 in a list in window 804.

Next (step 712), ELSM 108 enables the student to indicate that he/she would like to perform one of the listed classroom exercises. The student can indicate that he/she would like to perform one of the listed classroom exercises by selecting any one of the listed classroom exercises and then activating Perform Exercise button 806, which when activated instructs ELSM 108 to configure system 102 so that the student can perform the selected exercise. In step 714, ELSM 108 receives an indication that the student activated Perform Exercise button 806.

In response to the user selecting one of the listed classroom exercises and activating button 806, ELSM 108 accesses classroom database 190 to determine the VM identifiers associated with the selected exercise (step 716). Next (step 718), ELSM 108 launches the VMs identified by the VM identifiers. Advantageously, in one embodiment, when a VM is launched, the VMP accesses a suspended state file that is associated with the VM and places the VM in the state stored in the suspended slate file.

Once the VMs have been launched, the student can perform the entire selected exercise using the VMs running on computer system 102. In this manner, a course instructor need not configure several "real" machines in a classroom to enable a student to perform an exercise.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented system, comprising:
   two or more virtual machines installed on a single local computer, wherein the two or more virtual machines are implemented using different operating system environments;
   a database that stores information corresponding to at least one or more exercises and the two or mere virtual machines;
   a user interface that displays a list of the one or more exercises and enables the user to select at least one exercise;
   an exercise loader that is configured to access the database to determine the virtual machines that are associated with the selected at least one exercise; and
   a virtual machine launcher that launches the virtual machines associated with the selected at least one exercise.

2. The system of claim 1, wherein the database further stores information including names of the one or more exercises and two or more virtual machine identifiers associated with the two or more virtual machines and wherein the exercise loader is further configured to access the database to determine the virtual machine identifiers associated with the selected at least one exercise.

3. The system of claim 2, wherein the virtual machines that correspond to the selected at least one exercise are associated with a set of virtual machine (VM) files.

4. The system of claim 3, wherein the set of VM files comprise, at the least, a virtual disk file.

5. The system of claim 4, wherein the set of VM files further comprise a suspended state file.

6. The system of claim 1, wherein the database further stores information including the two or more of the virtual machine identifiers associated with the two or more virtual machines.

7. A computer-implemented system, comprising:
   a virtual machine platform that enables multiple operating system environments to run concurrently on a single local computer;
   two or more virtual machines associated with the virtual machine platform, wherein the two or more virtual machines are installed on the single local computer, wherein the two or more virtual machines are configured to enable a user to perform exercises, and wherein two or more virtual machines are associated with different operating system environments;
   a database that stores information corresponding to at least the exercises and the two or more virtual machines.

8. The system of claim 7, further comprising:
   a user interface that displays a list of the exercises and enables the user to select at least one exercise;
   an exercise loader that is configure to access the database to determine the virtual machines that are associated with the selected at least one exercise; and
   a virtual machine launcher that launches the virtual machines associated with the selected at least one exercise.

9. The system of claim 8, wherein the database further stores information including a name of the selected at least one exercise and two or more virtual machine identifiers associated with the two or more virtual machines and wherein the exercise loader is further configured to access the database to determine the virtual machine identifiers associated with the selected at least one exercise.

10. The system of claim 9, wherein the database further stores information including the virtual machine identifiers associated with the selected at least one exercise.

11. The system of claim 7, wherein the virtual machines associated with the selected at least one exercise are further associated with a set of virtual machine (VM) files.

12. The system of claim 11, wherein the set of VM files comprise a virtual disk file.

13. The system of claim 12, wherein the set of VM files further comprise a suspended state file.

14. A computer-implemented system, comprising:
   two or more virtual machines installed on a singe local computer, wherein the two or more virtual machines are implemented using different operating system environments;
   means for determining names of one or more courses that are available to be installed on the single local computer;
   means for displaying the names of the one or more courses;
   means for enabling the user to select at least one course;
   means for installing the selected course on the single local computer;
   means for determining names of one or more exercises that are associated with the selected at least one course;
   means for storing the course name and the names of the one or more exercises, wherein selecting the course name enables retrieval of names for the one or more exercises associated with the selected course name;
   means for enabling the user to select at least one exercise;
   means for determining the virtual machines that are associated with the selected at least one exercise; and
   means for creating a set of virtual machine files that correspond to the virtual machines that are associated with the selected at least one exercise.

15. The system of claim 14, further comprising means for storing virtual machine identifiers that correspond to the two or more virtual machines.

16. The system of claim 15, wherein the name of the selected at least one exercise is further associated with corresponding virtual machine identifiers so that the system is adapted to retrieve the virtual machine identifiers upon selecting the name of the exercise.

17. The system of claim 16, wherein the virtual machine identifiers are configured to locate said set of virtual machine files that correspond to the virtual machines that are associated with the selected exercise.

18. The system of claim 17, wherein said set of virtual machine files comprise one or more files.

19. The system of claim 18, wherein said set of virtual machine files comprises a virtual disk file.

20. The system of claim 19, wherein said set of virtual machine files further comprise a suspended state file.

21. A computer implemented method for enabling a user to perform two or more exercises using a single local computer, comprising:
    displaying a list of the two or more exercises, wherein the two or more exercises are associated with two or more virtual machines;
    receiving an indication that the user has selected two or more exercises;
    determining the two or more virtual machines associated with the selected exercises; and
    launching, on the single local computer, the two or more virtual machines associated with the selected exercises, wherein the two or more virtual machines are implemented using different operating system environments.

22. The method of claim 21, wherein determining the two or more virtual machines associated with the selected exercises comprises accessing a database that stores names of the exercises and associating the names with two or more virtual machine identifiers that correspond to the two or more virtual machines.

23. The method of claim 22, wherein determining the two or more virtual machines associated with the selected exercise further comprises determining the two or more of the virtual machine identifiers associated with the name of the selected exercise.

24. The method of claim 23, wherein the two or more virtual machines associated with the selected exercises comprise a set of virtual machine (VM) files.

25. The method of claim 24, wherein the set of VM files comprise, at the least, a virtual disk file.

26. The method of claim 25, wherein the set of VM files further comprise a suspended state file.

27. A computer implemented method for configuring a single local computer, comprising:
    determining names of one or more courses that are available to be installed on the single local computer;
    displaying the names of the one or more courses;
    enabling a user to select at least one course and to provide a request to install the at least one course on the single local computer;
    receiving an indication to install the at least one course on the single local computer;
    determining names of exercises that are associated with the selected at least one course;
    storing the course name and the names of the exercises, wherein selecting the course name enables retrieval of the names of exercises associated with the course name;
    enabling the user to select at least one exercise;
    determining virtual machines that are associated with the selected at least one exercise, wherein two or more virtual machines are implemented using different operating system environments; and
    creating virtual machine files that correspond to the virtual machines that are associated with the selected at least one exercise.

28. The method of claim 27, further comprising storing virtual machine identifiers that are associated with the two or more virtual machines.

29. The method of claim 28, further comprising associating the name of the selected at least one exercise with corresponding virtual machine identifiers, so that providing the name of the at least one exercise enables retrieval of the corresponding virtual machine identifiers.

30. The method of claim 29, wherein the virtual machine identifiers are used to locate the virtual machine files that correspond to the virtual machines that are associated with the selected at least one exercise.

31. The method of claim 30, wherein said set of virtual machine files comprise one or more files.

32. The method of claim 31, wherein said set of virtual machine files comprise a virtual disk file.

33. The method of claim 32, wherein said set of virtual machine files further comprise a suspended state file.

34. A computer program product embodied in a computer readable medium, comprising computer instructions for:
    displaying a list of exercises, wherein the exercises are associated with two or more virtual machines installed on a single local computer;
    receiving an indication that a user has selected two or more exercises;
    determining the two or more virtual machines associated with the selected exercises; and
    launching, on the single local computer, the two or more virtual machines associated with the selected exercises, wherein the two or more virtual machines are implemented using different operating system environments.

35. The computer program product of claim 34, wherein the computer instructions for determining the two or more virtual machines associated with the selected exercises comprises computer instructions for accessing a database that stores names of the exercises and associating the names with two or more virtual machine identifiers that correspond to the two or more virtual machines.

36. The computer program product of claim 35, wherein the computer instructions for determining the two or more virtual machines associated with the selected exercises further comprises computer instructions for determining the two or more of the virtual machine identifiers associated with the name of the selected exercises.

37. The computer program product of claim 36, wherein the two or more virtual machines associated with the selected exercises comprise virtual machine files.

38. The computer program product of claim 37, wherein the virtual machine files comprise at the least, a virtual disk file.

39. The computer program product of claim 38, wherein the virtual machine files further comprise a suspended state file.

40. A computer program product embodied in a computer readable medium, comprising computer instructions for:

installing two or more virtual machines on a single local computer, wherein the two or more virtual machines are implemented using different operating system environments;

determining names of one or more courses that are available to be installed on the single local computer;

displaying the names of the one or more courses;

enabling a user to select at least one course;

enabling the user to provide an indicator requesting installation of the at least one course on the single local computer;

receiving an indication to install the at least one course on the single local computer;

determining names of the exercises that are associated with the selected at least one course;

storing the course name and the names of the exercises, wherein selecting the course name enables retrieval of for the exercises associated with the course name;

enabling the user to select exercises;

determining the virtual machines that are associated with the selected exercises; and creating virtual machine files that correspond to the virtual machines that are associated with the selected exercises.

41. The computer program product of claim 40, further comprising computer instructions for storing virtual machine identifiers that correspond to the two or more virtual machines.

42. The computer program product of claim 41, further comprising computer instructions for associating the name of the selected exercises with corresponding virtual machine identifiers so that providing the name of the exercises enables retrieval of the corresponding virtual machine identifiers.

43. The computer program product of claim 42, wherein the virtual machine identifiers are used to locate the virtual machine files that correspond to the virtual machines that are associated with the selected exercises.

44. The computer program product of claim 43, wherein the virtual machine files comprise one or more files.

45. The computer program product of claim 44, wherein the virtual machine files comprise a virtual disk file.

46. The computer program product of claim 45, wherein the virtual machine files further comprise a suspended state file.

* * * * *